April 18, 1961
L. E. STAAK
2,979,779
IMPROVED METHOD OF PROVIDING A BEARING
LUBRICATING STRUCTURE
Filed April 18, 1955
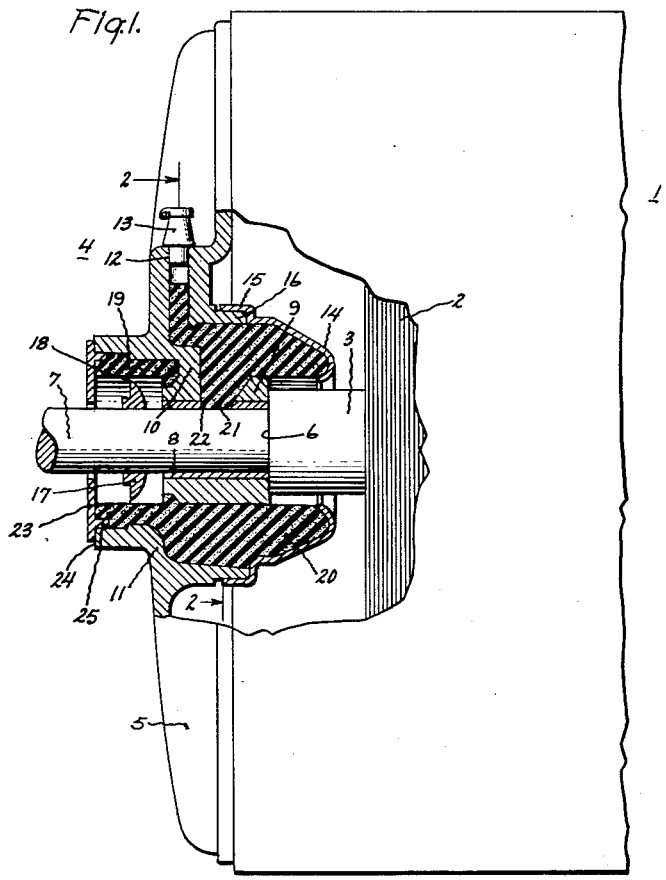
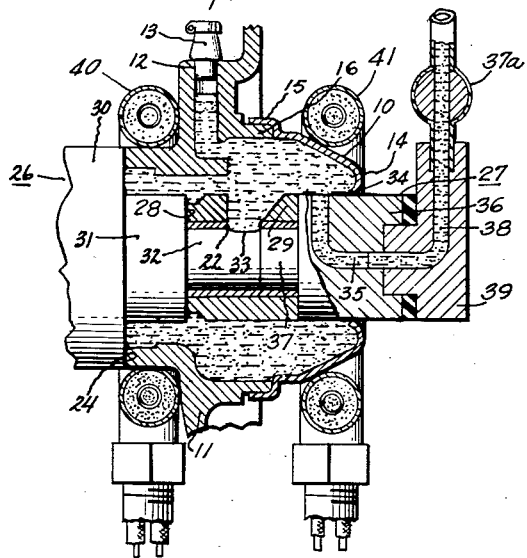
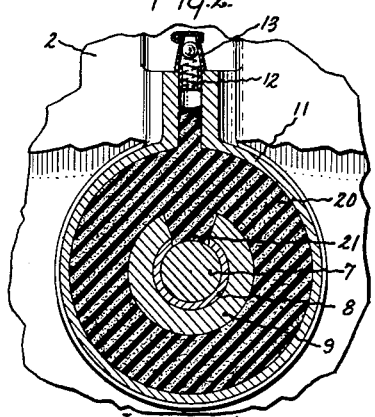
Inventor:
Louis E. Staak,
by *Robert L. Joris*
His Attorney.

United States Patent Office 2,979,779
Patented Apr. 18, 1961

2,979,779
IMPROVED METHOD OF PROVIDING A BEARING LUBRICATING STRUCTURE

Louis E. Staak, Fort Wayne, Ind., assignor to General Electric Company, a corporation of New York Filed Apr. 18, 1955, Ser. No. 501,963

5 Claims. (Cl. 18—59)

This invention relates to bearings for rotating shafts, and more particularly to sleeve bearings of the type which are lubricated by means of lubricant absorbent material positioned within the bearing housing.

It is most desirable that sleeve bearings for rotating shafts be capable of operating as long as possible without the necessity of lubricant having to be added. During such operation the bearing should, of course, be assured of an adequate supply of lubricant. Consequently, it has become conventional in connection with many types of sleeve bearings to provide a bearing housing within which there is positioned a mass of lubricant absorbent material. This mass acts in effect as a reservoir for the lubricant and generally is arranged to touch the shaft at one or more points so that lubricant is gradually fed to the shaft at the bearing surface. While this construction achieves the desired effect, it is both difficult and expensive to arrange the lubricant absorbent material properly within the bearing housing due to the relative inaccessibility of the space within the housing. This has created high costs in the manufacturing process and has prevented the full utilization of the space within the bearing housing because of the difficulty involved in completely filling the housing through the openings provided. It will be seen from the foregoing that it is most desirable to provide by a simple and economical method a sleeve bearing structure wherein the space within the bearing housing may be entirely filled with lubricant absorbent material.

It is, therefore, an object of this invention to provide an improved method incorporating the desirable features set forth above for effecting a bearing lubricating structure.

Further objects and advantages of this invention will become apparent and the invention will be better understood by reference to the following description and the accompanying drawing, and the features of novelty which characterize this invention will be pointed out with particularity in the claims annexed to and forming a part of this specification.

In one aspect thereof, the invention provides a method where the lubricant-absorbent material is located within the bearing housing by enclosing the space within the housing, introducing into the space a relative small amount of a material including a blowing agent which can be made to foam either by heat or agitation or a combination of the two, and causing the material to foam and fill the enclosed space with a unitary mass of foam material having an interconnecting cellular structure. The term "blowing agent" is used to denote a composition capable of releasing gas so as to "blow" a material into a foam consistency.

In the drawing, Figure 1 is a side view, partly broken away and partly in cross section, of a dynamoelectric machine having a shaft supported by the improved bearing of this invention;

Figure 2 is a view along line 2—2 in Figure 1; and

Figure 3 is a side view of the improved bearing of this invention, partly in cross section, illustrating the improved method of making the bearing.

Referring now to Figures 1 and 2 of the drawing, there is shown a dynamoelectric machine, generally indicated at 1, provided with a rotor member 2 preferably made up of a plurality of superimposed thin laminations of magnetic material. Rotor 2 is secured to a shaft 3 which is rotatably mounted within a bearing 4 secured in end shield 5 of the dynamoelectric machine 1. Shaft 3 is provided with a shoulder 6 defining an extended portion 7 which has a relatively small diameter. Shaft portion 7 is rotatably supported within an insert 8 of a sleeve member 9 which is secured by spokes 10 to the bearing housing portion 11. Housing portion 11 may be formed as part of the end shield 5, and is provided with an opening 12 through which lubricant may be introduced into the bearing and which is adapted to be closed by a standard pressed-in oil cup member 13. An annular housing member 14 terminates at one end in a flange 15 which is engaged with flange 16 of housing portion 11 so that, in effect, housing portion 11 and member 14 form together the complete bearing housing.

A lubricant slinger member 17 is secured on extended shaft portion 7, as shown, so as to be rotatable therewith. Slinger 17 has a relatively pointed peripheral section 18 from which the lubricant is adapted to be thrown back into part 19 of mass 20. This mass is formed of a foam material having an interconnecting cellular structure, and is arranged to fill the space between the bearing sleeve member 9 and the housing members 11 and 14. In addition, portion 21 of the material extends into an opening 22 in sleeve member 9 so as to form a wick in engagement with the surface of extended shaft portion 7. Mass 20 is adapted to be saturated with a suitable lubricant which is fed to the bearing surface through wick 21. The lubricant is adapted to be returned to part 19 of mass 20 from the periphery 18 of lubricant slinger 17 by centrifugal force. The fact that mass 20 fills the interior of the bearing housing structure permits a large quantity of lubricant to be stored and eliminates wasted space. An annular member 23, provided to preclude leakage of lubricant from the bearing, may be secured by a flange 25 to the outer end 24 of housing portion 11.

Referring now to Figure 3, the method of making the improved bearing of Figures 1 and 2 will be described. Before the shaft is inserted within sleeve 8 of bearing 4, a pair of mold parts 26 and 27 are respectively placed against ends 28 and 29 of sleeve member 9. Part 26 includes a large diameter portion 30 which is arranged securely in engagement with end 24 of the bearing housing, a second portion 31 of intermediate diameter which abuts against end 28 of sleeve member 9, and a third portion 32 which fits within insert 8 in the same manner as extended portion 7 of shaft 3. Portion 32 of mold part 26 is preferably provided with a recess 33 which is arranged to coincide with opening 22 in sleeve member 9.

Part 27 has a main portion 36 with a diameter slightly larger than that of shaft 3 so that it is relatively snugly in engagement with inner end 34 of housing member 14, and a second portion 37 which fits within insert 8 in the same manner as extended shaft portion 7. A passageway 35 is provided in portion 36 for the insertion of the required materials as will fully be set forth below. While passageway 35 has been shown in mold part 27 for illustrative purposes, it will of course be understood that this passageway may be equally effectively provided in the other mold part 26 or in any suitable part of the housing members 11 and 14 of the bearing.

With mold parts 26 and 27 in place as shown in Figure 3, the materials are inserted through passageway 35, the chemical reaction required to form the foam is achieved either by the provision of heat or agitation or both, as the case may be, and the mold parts 26 and 27 may then be removed. In the illustrated apparatus the foam materials are introduced into the passageway 35 from a suitable storage tank (not shown) through a shut-off valve 37a and a passageway 38 in a connecting member 39. The member 39, as shown, is sealed to the outer portion 36 of mold part 27 during the introduction of the foam materials and may be removed with part 27 after the lubricant absorbent mass is formed within the bearing housing. Once a suitable amount of the foam materials has been introduced, the valve 37a is closed and the materials are heated by means of two sheathed resistance heaters 40 and 41 disposed around the opposite ends of the bearing housing. The heat supplied from these heaters causes the materials to foam and form a lubricant absorbent mass filling the entire cavity within the housing elements 11 and 14. The dummy shaft portions 32 and 37 of the mold parts, of course, prevent any of the foam from entering the bearing sleeve and insert as it is formed. In the illustrated apparatus the materials are foamed without agitation but it will be understood that suitable motor driven means may be applied to the mold parts and the bearing housing members to shake them during the application of the heat to aid in the foaming process, or alternately that the materials may be foamed by shaking the mold members and the housing members without the application of heat.

As stated before, a prime feature of the invention is to provide a foam having an interconnecting cellular structure so that it will perform the wicking and feeding functions for the bearing lubricant. A great variety of different types of such foams are available. It is, therefore, clear that the inventive concept in this application is directed to a process for providing a particular type of bearing structure, and that the invention is not to be limited to any specific material. However, for purposes of illustration, two different means of obtaining entirely different foams (from a chemical standpoint) each having an interconnecting cellular structure will be given.

First: An epoxy resin, characterized by an epoxide equivalent of between 190 and 375, was heated to 110 degrees centigrade. A mixture consisting of two grams of ammonium carbonate, five grams of toluene, and two drops of sorbitan monolaurate polyoxyalkylene derivative, a wetting agent, was then mixed with the resin, and six grams of diethylene triamine was then added. The heat caused decomposition of the ammonium carbonate $[(NH_4)_2CO_3]$, the blowing agent, into water, ammonia $(NH_3)$ and carbon dioxide. The release of the carbon dioxide caused the resin to foam. Experience has shown that the foam so produced is characterized by an interconnecting cellular structure, with the size of the cells being controlled primarily by the amount of wetting agent used. Curing of the resin is controlled by the hardener used (in this case, diethylene triamine). Another blowing agent besides ammonium carbonate which may be used, is diazo amino benzene.

Second: To obtain a phenolic foam the materials used were: about 90 percent of A-stage phenolic resin (liquid and soluble); about 0.2 percent of sorbitan monolaurate polyoxyalkylene derivative, a wetting agent; about 0.7 percent of sodium bicarbonate (the blowing agent and catalyst); and about 9 percent of a 40 percent solution of phenolsulfonic acid. The acid was added to the other ingredients and agitated vigorously for 15 to 20 seconds. Without the necessity for any provision of heat, a foam having a density of one-third to 20 pounds per cubic foot (depending upon the volume in which the foam was contained) with good heat resistance and with an interconnecting cellular structure was obtained. It was found possible to substitute ammonium carbonate for the sodium carbonate with eqully good results.

In view of the foregoing, it will be seen that this invention provides a method of providing lubricant absorbent material in a novel bearing structure.

While the invention has been explained by a particular embodiment thereof, it will be apparent that improvements and modifications may be made without departing from the scope of the invention as defined in the appended claims.

What I claim as new and desire to secure by Letters Patent of the United States is:

1. The method of forming a reservoir for retaining lubricant and for supplying a bearing with the lubricant, comprising mounting said bearing within a housing open on at least one end, positioning mold means in engagement with said housing with dummy shaft means on said mold means extending into said bearing, introducing into said housing a relatively small amount of material capable of being foamed, causing said material to foam and fill completely the space within said housing with a unitary lubricant absorbent body of foam, with said dummy shaft means preventing the interior of said bearing from being filled with foam, and removing said mold means including said dummy shaft means after said body of foam is formed.

2. The method of forming a reservoir for retaining lubricant and for supplying a bearing with the lubricant, comprising mounting said bearing within an open ended housing, positioning mold members at opposite ends of said housing with dummy shaft means on at least one of said mold members extending into said bearing, introducing a relatively small amount of a material including a blowing agent into said housing, causing the release of gas from said blowing agent to cause said material to foam and fill completely the space within said housing with a unitary lubricant absorbent body of foam, with said dummy shaft means preventing the interior of said bearing from being filled with foam, and removing said mold members including said dummy shaft means after said body is formed.

3. The method of forming a reservoir for retaining lubricant and for supplying a bearing with the lubricant, comprising mounting said bearing within an open ended housing, positioning mold members in engagement with said housing at the open ends thereof, with dummy shaft means on said members extending into said bearing in abutting relationship, introducing into said housing a relatively small amount of material capable of being foamed, causing said material to foam and fill completely the space within said housing with a unitary lubricant absorbent body of foam having an interconnecting cellular structure, with said dummy shaft means preventing the interior of said bearing from being filled with foam, and removing said mold members including said dummy shaft means after said body is formed.

4. The method of forming a reservoir for retaining lubricant and for supplying a bearing with the lubricant, comprising mounting said bearing within an open ended housing, positioning mold members in engagement with said housing at the open ends thereof with dummy shaft means on at least one of said mold members extending into said bearing, introducing a relatively small amount of material including a blowing agent into said housing, heating said material to cause the release of gas from said blowing agent to cause said material to foam and fill completely the space within said housing with a unitary lubricant absorbent body of foam having an interconnecting cellular structure, with said dummy shaft means preventing the interior of said bearing from being filled with foam, and removing said mold members including said dummy shaft means after said body is formed.

5. The method of forming a reservoir for retaining lubricant and for supplying a sleeve bearing with the lubricant, comprising mounting said sleeve bearing within an open ended housing, positioning mold members in engagement with said housing at the open ends thereof, with dummy shaft means on said members extending into said bearing in an abutting relationship, introducing a relatively small amount of material including a blowing agent into said housing through a passage in one of said mold members, heating said material to cause the release of gas from said blowing agent thereby to cause said material to foam and fill completely the space within said housing with a unitary lubricant absorbent body of foam having an interconnecting cellular structure, with said dummy shaft means preventing the interior of said bearing from being filled with foam, and removing said mold members including said dummy shaft means after said body is formed.

References Cited in the file of this patent

UNITED STATES PATENTS

| | | | |
|---|---|---|---|
| 1,745,482 | Goodwin | Feb. 4, | 1930 |
| 1,752,295 | Felix | Apr. 1, | 1930 |
| 1,986,040 | Buhler | Jan. 1, | 1935 |
| 2,138,971 | Keeler et al. | Dec. 6, | 1938 |
| 2,199,006 | Minor | Apr. 30, | 1940 |
| 2,289,624 | Brown et al. | July 14, | 1942 |
| 2,295,823 | Banigan et al. | Sept. 15, | 1942 |
| 2,572,438 | Branson | Oct. 23, | 1951 |
| 2,629,698 | Sterling | Feb. 24, | 1953 |
| 2,644,199 | Miller | July 7, | 1953 |
| 2,706,311 | Durst et al. | Apr. 19, | 1955 |
| 2,728,702 | Simon et al. | Dec. 27, | 1955 |
| 2,877,503 | Puderbaugh et al. | Mar. 17, | 1959 |